United States Patent [19]

Marble et al.

[11] Patent Number: 5,128,046
[45] Date of Patent: Jul. 7, 1992

[54] WATER CLARIFICATION THROUGH CHELATION

[75] Inventors: Robert A. Marble; Michael L. Braden, both of Sugar Land, Tex.

[73] Assignee: Nalco Chemical Company, Oak Brook, Ill.

[21] Appl. No.: 509,534

[22] Filed: Apr. 16, 1990

[51] Int. Cl.$^5$ .................................................. C02F 1/56
[52] U.S. Cl. ...................... 210/705; 166/267; 210/708; 210/728; 210/734; 210/735
[58] Field of Search ................ 166/266, 267; 210/708, 210/705, 727, 728, 729, 733, 734, 735, 698, 701

[56] References Cited

U.S. PATENT DOCUMENTS

| | | | |
|---|---|---|---|
| 3,502,575 | 3/1970 | Hepp et al. | 210/705 |
| 4,049,547 | 9/1977 | Hamer et al. | 210/729 |
| 4,198,300 | 4/1980 | Williams | 210/703 |
| 4,454,047 | 6/1984 | Becker et al. | 210/705 |
| 4,588,508 | 5/1986 | Allenson et al. | 210/708 |
| 4,741,835 | 5/1988 | Jacques et al. | 210/708 |
| 4,835,234 | 5/1989 | Valint et al. | 210/708 |

FOREIGN PATENT DOCUMENTS

| | | | |
|---|---|---|---|
| 2543135 | 10/1976 | Fed. Rep. of Germany | 210/727 |
| 54-071855 | 6/1979 | Japan | 210/727 |

*Primary Examiner*—Peter Hruskoci
*Attorney, Agent, or Firm*—John G. Premo; Donald G. Epple

[57] ABSTRACT

Improved water quality of overboard waters discharged from off-shore oil producing rigs is obtained by treating oily produced waters from a crude oil separator, and prior to exposure to air, with an effective coalescing amount of a combination of an iron chelating agent and various polymeric coagulating/coalescing agents. The preferred chelating agent is citric acid, or its salts, EDTA, HEDTA, or mixtures thereof. The polymeric coagulating/coalescing agents may be anionic, cationic, ampohoteric, but are most preferably copolymers of acrylamide with at least one of the monomers chosen from the group consisting of acrylic acid, methacrylic acid, DMAEA, DMAEM, or their acid of quaternary salts, DADMAC, MAPTAC, AMPS, and the like.

10 Claims, No Drawings

WATER CLARIFICATION THROUGH CHELATION

INTRODUCTION

When operating an off-shore drilling rig for the purpose of tapping, collecting, and recovering hydrocarbon values from under seabed crude oil formations, many problems are encountered which are not encountered when the drilling rig and oil recovery process is on land.

One of the problems that is created when recovering oil from an off-shore platform drilling rig is a problem of dealing with waters that are simultaneously recovered with hydrocarbon values in crude oil emulsions. Crude oil normally is recovered from formations in an emulsion form or in an admixture of hydrocarbon values with waters, which waters may be brackish and can contain numerous types of dissolved salts. These oil production waters are normally removed from the crude oil emulsions through a separating device sometimes referred to as a separator, or a "heater-treater", which device allows the hydrocarbon values to be separated from the water fractions recovered with the crude oil emulsions or contained in the recovered crude oils. Then the hydrocarbon values are recovered from these separating devices which have the primary purpose of separating the oily hydrocarbon fractions from the water fractions. The water fractions, called "produced water", often still contain oily contaminants, inorganic and organic suspended matter, and other contaminants which are then essentially removed in other operations, before the waste waters, often called overboard waters, are expelled to the open seas, bays, rivers, or lake waters in which the platform resides.

After the separation of crude oil into its oily hydrocarbon fractions and oily water fractions, the hydrocarbon fraction is normally piped to a refiner or stored for later processing by a refiner. The water fractions present a problem for the operator of a drilling rig, particularly when that rig is off-shore. The off-shore rig must be equipped with devices, sometimes installed on floating barges anchored to the platform, that can treat this water to remove hydrocarbon values which are contained in the water, which values are still valuable and also to remove suspended organic and inorganic matter to form a water which can be discarded into the surrounding oceans without presenting major environmental impact on sea life.

A normal treatment, typical of off-shore treatment, would be to collect and route the oily water fractions obtained from the separating devices treating crude oil emulsions to a device which would pass oxygen-free gas such as nitrogen, and the like, through the water with agitation in a chambered operation so as to form a floating hydrocarbon-enriched foamy layer which can be skimmed from the top of the water phase. The hydrocarbon-enriched foams so removed are recycled to recover residual hydrocarbon values, thereby also forming an essentially oil-free oil production waste water for discharge.

However, when this operation is typically run, the performance of the operation towards the goal of forming this essentially oil-free oil production waste water having sufficient quality for discharge, often depends upon the contaminants that are contained in the water being recovered with the crude oil.

It is particularly a problem when the waste waters being recovered with the crude oil emulsions contain high concentrations of dissolved iron salts or other dissolved transition metal salts, which when exposed to air or oxidation, are oxidized to higher oxidation states, and form thereby, precipitates with water components such as hydroxide iron, carbonate anion, chloride anion, and the like. This causes increasing build-up of solids forming in the waste waters, which solids have a tendency to collect and absorb hydrocarbon values, thereby not only decreasing the amount of hydrocarbon recovered from the crude oil, but also creating an environmentally unacceptable waste water which contains these suspended solids as well as adsorbed hydrocarbon values, which waste waters are preferably not dischargeable to the environment.

It is, therefore, an object of this invention to treat oily water fractions being recovered from crude oil emulsions from undersea formations so as to prohibit the formation of solids during the treatment thereby increasing water quality to the point where it can be safely discharged to the environment.

It is another object of the invention to decrease the amount of solids formed or forming in these oil production waste waters so as to increase the recovery of hydrocarbon values, decrease the load in terms of total weight of inorganic and organic matters in the waste waters requiring treatment prior to the discharge of these waste waters, thereby improving hydrocarbon recovery, and improving water quality in preparation for discharge to the environment.

It is an object of this invention to treat these waste waters prior to oxidation with air or any purposefully added oxidizing agent with a chelating agent for soluble iron salts, preferably ferrous iron salts, which chelating agent has a strong enough complexing capability so that the oxidation of these iron species is prohibited, thereby retaining the iron in solution and preventing precipitation of iron salts.

Finally, it is an object of this invention to improve a process for recovering residual hydrocarbon values from oil production waste waters prior to discharge from an off-shore oil rig comprising collecting crude oil emulsions from undersea formations, separating oily hydrocarbon fractions from oily water fractions in an operation which breaks crude oil emulsions into oily hydrocarbon and oily water fractions, collecting and storing for later processing the oily hydrocarbon values, collecting and treating the oily water fractions by air-blowing these water fractions to form and then collect a floating hydrocarbon-enriched foamy layer which is skimmed from the surface of the remaining waters for recycle and recovery of residual hydrocarbon values, thereby forming an essentially oil-free oil production waste water for discharge, the improvement providing for the treatment of the oily water fractions prior to air-blowing with an effective combination product comprising an iron chelating agent in combination with a polymeric coagulant/coalescing agent.

THE INVENTION

We have accomplished our goals of providing for improved water quality for discharge into the open ocean from an oil rig operating off-shore by developing a process for recovering residual hydrocarbon values from oil production waste waters prior to discharge from an off-shore oil rig, which process comprises collecting crude oil emulsions from undersea formations, treating and separating oily hydrocarbon fractions from oily water fractions by adding crude oil emulsions to devices, i.e. separators, which break these emulsions into their separate oily and aqueous phases, and separate the same into separate oily hydrocarbon fractions and oily water fractions, then collecting the oily hydrocarbon values and either further processing the same or storing the same for further processing in a refinery, and then collecting and treating the oily water fractions by passing oxygen-free gas and agitating these fractions in a device designed to form and collect a floating hydrocarbon-enriched foamy layer for recycle and recovery of residual hydrocarbon values, and thereby forming an essentially oil-free oil production waste water for discharge;

the improvement comprising treating the oily water fraction from the separator prior to oxygen-free inter gas blowing (hereafter blowing) and agitation with an effective coalescing amount of a combination product comprising an iron chelating agent in admixture with a polymeric coagulant coalescing agent.

The improvement developed comprises treating the oily water fraction after it has been recovered from crude oil emulsions, but prior to its being exposed to blowing and agitation with an effective coalescing amount of a combination product comprising the iron chelating agent and the polymeric coagulant coalescing agents described above. The combination can include about a 100:1 to about a 1:100 weight ratio of the iron chelating agent to the polymeric coagulant/coalescing agent. This combination may also be made in such a way so as to control separately the addition of the iron chelating agent and the addition of the polymeric agents to the produced water. Preferably the chelating agent is added at a level which is essentially at least fifty percent (50%) of the stoichiometric amount relative to the dissolved iron salts in the produced waters. The polymeric agents are added at concentrations ranging between 0.05 to about 25 ppm, based on treated waters, of the active polymeric agent. However, formulations containing the chelating agent and the polymeric agent, either combined in a single formula or in separate formulations which are then added to the produced waters incrementally, in any order or simultneously, can be used.

THE IRON CHELATING AGENTS

The iron chelating agents are preferably those chelating agents that have a strong tendency to form complexes which are water soluble with ferrous iron or ferric iron, which complexes have strong enough complexing capability so that the iron salts are not affected by water chemistries which lead to precipitation of insoluble iron salts such as iron oxides, iron hydroxides, and the like. These iron chelating agents are preferably chosen from the group consisting of citric acid, ethylenediaminetetraacetic acid (EDTA), hydroxyethylenediaminetriacetic acid (HEDTA), hydroxy acetic acid, and mixtures thereof. These chelating agents may also be admixed with various kinds of neutralizing agents such as ammonia, amines, caustic or potassium hydroxide values, and the like, so that the chelating agents are easily water soluble. These chelating agents may be present in their various salt forms or mixtures with their salt forms. For example, if citric acid is used in our invention, it may be used either as the free acid or any water soluble salt thereof, including sodium salts, potassium salts, ammonium salts, alkyl amine salts, quaternary amine salts, mixtures thereof, and the like. Similarly, EDTA, HEDTA, hydroxy acetic acid, or any other iron chelating agent may be present or added to the waste waters being treated in their various salt forms or mixtures of their various salt forms as well as their free acid form.

Preferably, the iron chelating agents are chosen from the group consisting of citric acid, ethylenediaminetetraacetic acid, HEDTA, hydroxy acetic acid, or mixtures thereof. Sometimes low molecular weight polyamines may also be added to these iron chelating agents to assist in the formulation stability of these materials prior to use.

Preferably, the chelating agent chosen, for example citric acid, is added to the water in sufficient quantity to complex at least a major portion of these water soluble iron salts present in the water. Most preferably, these chelating agents are added at a stoichiometric level so that all of the iron present in water soluble form may be chelated and retained in solution.

Most preferably, citric acid is used, sometimes in combination with hydroxy acetic acid to provide for chelation of water soluble iron values which normally occur as ferrous iron salts dissolved in the waste waters recovered from crude oil production. Most preferably, the iron chelating agent is citric acid, or its water soluble salts.

THE POLYMERIC COAGULANT COALESCING AGENTS

The polymeric coagulant/coalescing agents may be nonionic, anionic, cationic, or amphoteric, i.e. they may contain both anionic and cationic charges. These coagulant/coalescing agents are polymeric in nature, preferably are formed by vinylic monomers, and have a molecular weight ranging between about 100,000 up to and including 25,000,000. Preferably the molecular weight of these polymeric coagulant/coalescing agents run between about 200,000 to about 20,000,000. The polymeric coagulant coalescing agents may also be admixtures of various polymeric components having the above molecular weight ranges (all molecular weights are weight average molecular weights) and when admixtures are present, the molecular weight distribution may be multi-modal, bi-modal, or mono-modal. Preferably, these polymeric agents are soluble in water.

It is preferred that the polymeric coagulant coalescing agents are polymers chosen from the group consisting of vinylic polymers containing at least one of the monomers chosen from the group consisting of acrylamide; methacrylamide; acrylic acid; methacrylic acid; N,N,-dimethylamino ethyl acrylate (DMAEA); N,N-dimethylamino ethyl methacrylate (DMAEM); N,N-dimethylaminoethyl acrylate; methyl or ethyl sulfate; or methyl or ethyl chloride quaternary salts; N,N-dimethylaminoethyl methacrylate; methyl or ethyl sulfate; or methyl or ethyl chloride quaternary salts; diallyl dimethyl ammonium chloride (DADMAC); sulfonated N-alkyl substitued acylamide; methacrylamido trimethyl ammonium chloride (MAPTAC); acrylamido methyl propane sulfonic acid (AMPS); and the like. It is preferred that the coagulant polymeric coalescing agents are vinylic polymers which are either anionic or cationic in nature.

These charged polymers may be cationic and contain at least one of the monomers chosen from the group acrylamide; methacrylamide; acrylic acid; methacrylic acid; DMAEM; DMAEA; DMAEM methyl quaternary salts; DMAEA methyl or lower alkyl quaternary salts; DADMAC; AMPS; MAPTAC; and the like. The coagulant/coalescing polymeric agents can be polymers formed with DMAEA or DMAEM lower alkyl quaternary salts, normally methylchloride or methylsulfate quaternary salts, or the acid salts of DMAEA or DMAEM, for example the sulfuric acid salts of these monomers. These polymers may be homopolymers, or they may be copolymers with acrylamide, methacrylamide, or other neutral or cationic vinyl monomers.

Although the coagulant/coalescing agent may be cationically charged, our invention operates very successfully with anionically charged polymeric coagulating/coalescing agents in combination with the iron chelating described above. When the vinylic polymer is anionically charged, it may be a homopolymer of acrylic acid or methacrylic acid, AMPS, or other sulfonated monomers, or it may be a copolymer formed by reacting these anionic vinyl monomers with acrylamide, methacrylamide, and the like. These materials also may contain cationically charged monomers, thereby forming amphoteric polymeric agents, or may be derived from transamidation of acrylamide or methacrylamide containing polymers where the transamidation leads to sulfonated N-alkyl substituted polymers.

Preferably, these coagulant polymeric coalescing agents are those polymers derived from the polymerization of DMAEA or DMAEM monomers, which monomers are alkylated to form either the methyl chloride or methylsulfate quaternary salts. These cationic polymers normally have a molecular weight ranging between about 100,000 to about 10,000,000, preferably between about 200,000 and about 5,000,000, and most preferably between 250,000 and about 2,500,000. These cationic polymers may be homopolymers of DMAEM, methyl quaternary salts or sulfuric salts thereof, or they may be copolymers of these monomers with acrylamide or methacrylamide.

When the polymers are anionic, it is preferable that the polymers are homopolymers of acrylic acid or methacrylic acid, or copolymers of acrylic acid, methacrylic acid, ethyl acrylate, and acrylamide or methacrylamide, or mixtures thereof.

The molecular weights of the anionic polymers normally are higher than those of the cationic polymers. The molecular weight of the anionic coagulant polymeric coalescing agents normally run between about 500,000 and about 25,000,000, most preferably between about 1,000,000 to about 20,000,0000, and most preferably between about 2,500,000 and about 20,000,000.

Combinations of cationic and anionic polymers may be useful, but when used these polymers are normally added to the water incrementally.

When combinations are used, the combination normally is used intermittently, that is a first cationic material is added to the water followed later by the anionic material, or vice versa, with sufficient time allowed between the addition of the two coagulating/coalescing polymers for reaction with solids, suspended oils, and the like. Although it often is preferred to initially treat with the cationic polymeric coalescing agent followed by the anionic polymeric coalescing agent, it is acceptable to reverse this treatment.

The oil production waste waters cause difficulties particularly when they contain at least 5 ppm water soluble iron salts. These water soluble iron salts are for the most part in the ferrous iron form, which when exposed to air or oxidizing conditions are oxidized to ferric iron salts which then react with normally present anions in these waste waters to form insoluble precipitates. These insoluble precipitates are particularly formed if air is purposely bubbled through these waste waters in the process of recovering residual hydrocarbon values. Often this is purposely done in a unit referred to as the Wemco unit, which unit is equipped with gas introduction means, agitation means, and separating means, often in variously divided chambers, sometimes equipped with skimming means and underflow means for continuous operation. When the gas is introduced in the Wemco device to the oily waste waters, a foam is formed which is enriched with hydrocarbon values and assists in recovery of both these hydrocarbon values and insoluble matters (both organic and inorganic) by forming a floating residue on the surface of the waters being treated in the Wemco device. These floating residues are skimmed from the top of the waters and recovered and recycled to recover hydrocarbon values.

The waters remaining may still contain some soluble salts, primarily NaCl or other brackish salts, but also may contain some Fe, Ca, Mn, and other alkaline earth salts, or transition metal salts, depending on the contaminations of these waters in the formations from which the crude oil is being recovered. If the water so contains these materials when discharged into the surrounding sea waters, particularly if iron is present, or other multi-valent cationic species, these materials can act as coagulating agents when hitting the seawater, and if the seawater itself is contaminated with suspended organics or inorganic materials or biological growths and the like, the presence of these multi-valent cations can cause coagulation of these materials and form precipitates which gives the appearance that the water quality of the discharged water is not sufficient. Also, if iron salts particularly are left untreated, the oxidizing conditions normally observed in the Wemco units cause ferrous iron to be ozidized to ferric iron, and cause a large build-up of insoluble iron salts in the waters passing the Wemco unit. These insoluble iron salts absorb hydrocarbon values and lead to very finely divided materials which are often not recovered in the floating foams and are dispersed and discharged in the water, overboard discharge leading to the formation of what is called "sheen" on the surface of the salt waters (or bay waters) receiving the discharged overboard waters.

The quality of treated produced water discharged (sometimes referred to as overboard waters) from offshore platforms is now regulated by the Environmental Protection Agency and the Marine Management Service. Current restrictions on the amount of oil and grease contained in the overboard water is presently set at 48 mg/liter without a visible "sheen". Many platforms, particularly those platforms recovering crude oils which have high iron content, can be in violation of these regulations. Observation often leads to the conclusion that visible "sheens" are present, sometimes with brown foams forming on the seawaters, or bay waters as the case may be, which are exposed to the platform treated overboard waters being discharged. In addition, the major buildup of these solids, particularly the insoluble iron salts, produced from normally soluble iron salts contained in the produced waters cause a precipitate to form from these waters, which precipitated deposits can cause mechanical difficulties in the pumping and treating systems, and can cause chemical pumps to become clogged in the treating systems thereby creating less efficient operations than design would predict.

Also, it appears as if this difficulty is temperature related, since as temperature increases the amount of "sheen" and brown foam observed on the bay waters or seawaters also appears to increase.

THE PROBLEM AND THE SOLUTION

It has been found that by the treatment (preferably prior to exposure to oxidizing conditions) of produced waters entering the Wemco devices (or similar equipment used to remove residual oils and suspended matter from produced waters) with the combinations of this invention, i.e. the iron chelating agents and polymeric coagulant/coalescing agents, the problem of "sheen" can be decreased or eliminated entirely, and the brown foams normally seen in these kinds of operations can also be eliminated or decreased appreciably. The quality of the discharged water is improved and the improved results of our invention are observed.

To better describe our invention, we present the following examples.

EXAMPLES

1. A trip was made to an operating oil recovery platform in the Gulf of Mexico. This platform was equipped with oil recovery devices, phase separators which isolated hydrocarbon values from water values in the recovered crude oil, and Wemco treaters to treat the oily produced waters recovered from the separators. The devices were being treated with various chemicals to enhance crude oil emulsion breaking and to enhance operation of the Wemco devices to form hydrocarbon-enriched foams as described above in treated waters.

The chemical treatments did not include iron chelating agents and did not include the preferred polymeric coagulating/coalescing agents of this invention.

Observations were made which indicated a visible "sheen" on the bay waters to which this platform discharged its overboard water and also the presence of a brown foam on the bay waters.

The chemical pumps showed, on examination, that they had become clogged with debris and that chemicals being injected into the system were, therefore, not being injected optimally. These pumps were repaired, and upon repair, the "sheen" disappeared, but the brown foam remained on the bay waters. Operators of this unit indicated that increases in temperature observed between winter months and summer months appeared to effect the amount of brown foam observed on the bay waters, in that during summer months and higher temperatures when the bay waters had a temperature exceeding 70° F., sometimes as high as 80° F., the amount of brown foam increased. These observations were, however, subjective.

A cationic polymeric coagulant/coalescing agent which was a copolymer of acrylamide and dimethylaminoethyl methacrylate, sulfuric acid salt, was added to the produced water before the produced water entered the treating operation, i.e. the Wemco unit. This material was added so as to provide about 0.2 to about 5 ppm active polymer to the waters being treated. The addition of just this coagulating polymer improved the operation of the Wemco unit and decreased the amount of foam being observed on the surface of the bay waters. The "sheen" was eliminated.

On-site iron analysis showed that there was between 20 and 30 ppm soluble iron in the produced water being fed to the Wemco device. Analysis of the foamy deposit from the bay waters indicated that it contained about one-third insoluble residue, mostly silica, aluminum oxide, and ferric oxide. The remainder was hydrocarbon.

The treatment of this platform water with only the coagulating chemical, however, did not immediately solve the problem of formation of iron salts. Purposeful addition to the waste water of a bleaching solution immediately formed orange-red iron precipitates and analysis of this water later confirmed the presence of from 20 to 30 ppm iron salts.

Because of the analysis of the above deposits and water samples, it appeared as if the difficulties observed on this platform might be caused by the presence of iron and the oxidation of ferrous iron to ferric iron, causing a build-up in solids in the Wemco unit leading to the discharge of overboard waters which probably did not meet requirements.

2. About four months later, an opportunity presented itself at a second off-shore drilling rig to test the combinations of this invention. The following products were tested by performing bench scale tests with a bench scale Wemco unit or with beaker tests, using as the input waters, produced waters from the platform separator, which waters were being fed to the Wemco unit on the platform barge. The Wemco unit recovered residual hydrocarbon values from produced waste waters recovered from the separators or heater treaters on the platform. The separators isolated the crude oil hydrocarbon fractions from the produced water fractions.

Table I presents a list of polymeric coagulant/coalescing agents which were tested. Polymer 1 is a polymer containing 40 weight percent methacrylic acid and 60 weight percent ethylacrylate in a water external oil-in-water emulsion. When this emulsion is added to the test waters, the polymer dissolves and acts to coagulate and coalesce hydrocarbon values and to flocculate inorganic values present in the water. These materials are then frothed to the surface by blowing air through the water with agitation in either the bench top Wemco test unit or, alternatively, the full-scale Wemco unit. Test samples of this produced water may also be shaken vigorously with air in test bottles containing the ingredients and reactants.

TABLE I

| Polymer type | Polymer No | Molecular Weight | Charge |
|---|---|---|---|
| Copolymer:<br>47 mole percent<br>methacrylic acid<br>53 mole percent<br>ethylacrylate | 1[1] | 2,500,000–3,500,000 | anionic |
| Copolymer:<br>54 mole percent<br>DMAEM.sulfuric<br>acid salt<br>46 mole percent<br>acrylamide | 2[2] | 250,000–2,500,000 | cationic |
| Copolymer:<br>20 mole percent<br>sodium acrylate<br>80 mole percent<br>acrylamide | 3[2] | 12,500,000–20,000,000 | anionic |
| Homopolymer:<br>DMAEM.sulfuric<br>acid salt | 4[3] | 200,000–450,000 | cationic |

TABLE I-continued

| Polymer type | Polymer No | Molecular Weight | Charge |
|---|---|---|---|
| Citric Acid[4] | — | — | — |

[1]This polymer was added as a one percent water solution made from a water external oil-in-water emulsion containing the polymer dispersed in water.
[2]These polymers were added as one percent water solutions made from a water-in-oil latex emulsion containing the polymer in the water phase dispersed in oil.
[3]This polymer was added as a one percent water solution made from a 22 weight percent solution of the polymer.
[4]Citric Acid. This material was added as a 50 weight percent aqueous solution.

In Table I, polymer 1 is a copolymer of methacrylic acid and ethylacrylate used primarily as a water external oil-in-water latex containing 47 mole percent methacrylic acid, 53 mole percent ethylacrylate in a copolymer having a molecular weight ranging between about 2,500,000 and 3,500,000, and, of course, being anionically charged.

Polymer 2 is a copolymer containing 54 mole percent dimethylaminoethyl methacrylate as the sulfuric acid salt, and 46 mole percent acrylamide, this polymer having a molecular weight ranging between about 250,000 and 2,500,000, and being cationically charged.

Polymer 3 is a copolymer containing about 20 mole percent sodium acrylate and 80 mole percent acrylamide, having a molecular weight ranging between about 12,500,000 up to about 20,000,000, and being anionically charged.

Polymer 4 is a homopolymer of dimethylaminoethyl methacrylate as the sulfuric acid salt, having a molecular weight ranging between about 200,000 to about 450,000, and being cationically charged. Also in Table I, citric acid is shown as the preferred iron chelating agent.

TEST PROCEDURES

1. Bottle Test

About two to five gallons of produced water was collected after the separators and prior to introduction to the platform Wemco device. Six ounce prescription bottles were filled to 100 ml marks and inverted several times to coat the bottles with the produced water and crude oil emulsions. Dosages of the chemicals above were added to the bottles during the test procedure using one percent active polymer solutions to achieve the test levels indicated in the Tables to be presented. The bottles were capped, numbered, and agitated. Agitation can be varied by the vigor used to shake the bottles held in the hand.

Observations were made relative to water clarity, dispersed oil droplets, and were quickly graded, as needed, with a grade of 1-10 with 1 being the best grade. Also, tests could be done with a phototester and measurement of the degree of clarity made using the spectrophotometer. The spectrophotometer measured the percent transmittance; the higher the percent transmittance, the clearer the water and the more successful the treatment.

2. Wemco Bench Test

The bench Wemco test procedure tested the various coagulant coalescing agents by themselves or in combination with the iron chelating agents using the following procedure: from two to five gallons of produced water from the oil/water separators were collected. About 250 ml of this water were added to the bowl of the test bench Wemco device. Either a syringe or a pipette was used to add the test chemical as a one percent solution of active ingredients. The bench Wemco was equipped with air sparging means and agitation means for air-blowing and agitation.

The agitator in the test Wemco device was turned on for one minute at 1800 rpm. Observations were made during agitation in regard the ability of the oil to remain on top of the foam rather than being mixed back into the water.

The agitator was turned off and observations were made for a period of about five to fifteen seconds, allowing the foam collected to break. 100 ml of water was collected below the surface of the foam using a pipette or a syringe and placed in a six ounce prescription bottle for observation or further tests with the phototester. The waters were then discarded, the bowl of the bench Wemco device and agitator were cleaned and wiped off, and test procedures repeated for various products and dosages. The results of these tests were either visually graded from 1-10, as above, or compared using a phototester and the measure of the transmittance obtained with the phototester.

Test results are presented in the following Tables.

TABLE II

| Polymer | Dosage. ppm | % Transmittance | Comments |
|---|---|---|---|
| A | | | |
| 1 | 20 | 90 (time zero) | no chelant |
| 1 | 5 | 76 (time zero) | no chelant |
| 2 | 2 | 82 (time zero) | no chelant |
| 4 | 10 | 88 (time zero) | no chelant |
| 4 | 5 | 80 (time zero) | no chelant |
| Blank | — | 68 (time zero) | no chelant |
| B | | | |
| 1 | 5 | 56 (time zero) | no chelant |
| 3 | 5 | 68 (time zero) | no chelant |
| 2 | 5 | 56 (time zero) | no chelant |
| 2 & 3 | 5 & 5 | 85 (time zero) | no chelant |
| Blank | — | 44 (time zero) | no chelant |

Dosage was in parts per million (ppm) of the original polymer formulation, based on the water being treated.

In Tables IIA and IIB above, different waters were tested from two different platforms operating in essentially the same geographic location.

In spite of the reasonable results obtained by treating the produced waters with only the coagulant coalescing polymer as described in Tables IIA and IIB, as time passed, the treated waters formed cloudy precipitates and their quality in terms of visual observation rapidly decreased such that over a passage of two to six hours, the water quality had deteriorated to a point where the waters had nearly the same transmittance as the blanks with no treatment.

It was therefore decided to add, in addition to the polymers listed above, certain chelating agents to attempt to control the deterioration of water quality and enhance the recovery of hydrocarbon values. However, these chelating agents were not available for testing at this first off-shore site.

The results in Tables III and IV are therefore presented, which results were generated about four months after the results in Table II, and which results show that the combination of the invention enhanced water quality and led to long-term stability of the water being discharged to the open sea. The results in Tables III and IV were generated at a different geographical site and were not from the off-shore site of the tests presented in Table II.

TABLE III

PLATFORM "A"

| Polymer | Dosage, ppm | Percent Transmission Zero Time | Percent Transmission Two Hours[1] | Comments |
|---|---|---|---|---|
| 2 | 5 | 50 | — | |
| 4 | 5 | 50 | — | |
| 4 | 10 | 50 | — | |
| 2 | 10 | 47/92* | — | *phototester failed |
| 2 + CA | 5 + 10 | 53 | — | |
| 2 + CA | 5 + 15 | 79 | — | |
| 2 + CA | 5 + 15 | 82 | — | |
| CA | 15 | 76 | — | |
| 2 + CA | 5 + 2.5 | 45** | — | **water quality changed. New series of tests the presence of citric acid improved long term stability, as measured visually. |
| 2 + CA | 5 + 5 | 46 | — | **water quality changed. New series of tests the presence of citric acid improved long term stability, as measured visually. |
| 2 + CA | 5 + 7.5 | 56 | — | **water quality changed. New series of tests the presence of citric acid improved long term stability, as measured visually. |
| 2 + CA | 5 + 10 | 69 | — | **water quality changed. New series of tests the presence of citric acid improved long term stability, as measured visually. |
| 2 + CA | 5 + 15 | 81 | — | **water quality changed. New series of tests the presence of citric acid improved long term stability, as measured visually. |
| 2 | 5 | 48 | — | **water quality changed. New series of tests the presence of citric acid improved long term stability, as measured visually. |
| 4 + CA | 20 + 15 | 86 | — | **water quality changed. New series of tests the presence of citric acid improved long term stability, as measured visually. |
| Blank | — | 44 | — | **water quality changed. New series of tests the presence of citric acid improved long term stability, as measured visually. |
| 2 | 5 | 70 | 44 | Fresh water sample |
| Blank | — | 54 | 38 | |
| 2 + CA | 5 + 5 | 54 | 48 | |
| 2 + CA | 5 + 10 | 50 | 50 | |
| 2 + CA | 5 + 15 | 52 | 50 | |
| CA | 15 | 56 | 50 | |
| 2 + CA | 5 + 15 | 78 | 72 | |
| 2 | 2 | 82 | 46 | |
| 2 + CA | 5 + 15 | 78 | 72 | |
| 2 + CA | 5 + 15 | 80 | 70 | |
| Blank | — | 68 | 39 | |
| CA | 15 | 92 | 76 | Fresh Produced Water Sample |
| 4 | 5 | 80 | 46 | |
| 4 | 10 | 88 | 48 | |
| 4 | 20 | 88 | 46 | |
| 4 + CA | 5 + 15 | 84 | 46 | |
| Blank | — | 72 | 41 | |
| 2 + CA | 5 + 15 | 86 | 80 | |
| 1 | 5 | 76 | 46 | |
| 1 | 20 | 90 | 48 | |
| 1 + CA | 10 + 15 | 92 | 86 | |
| 1 + CA | 5 + 15 | 88 | 84 | |

([1]Note: "—" = no phototester readings taken.)
CA = citric acid (as active free acid)

TABLE IV

PLATFORM "B"

| Polymer | Dosage, ppm | Percent Transmission Zero Time | Percent Transmission Two Hours | Comments |
|---|---|---|---|---|
| 2 | 5 | 56 | — | |
| 2 | 10 | 68 | — | |
| 2 + CA | 5 + 15 | 78 | — | |
| CA | 15 | 78 | — | |
| Blank | — | 54 | — | |
| Blank (shaken) | — | 36 | — | |
| 2 + CA | 5 + 15 | 77 | 70 | Fresh Sample Separator Outlet |
| 1 + CA | 20 + 25 | 90 | 83 | |
| 1 + CA | 20 + 25 (repeat) | 80 | 72 | |
| 4 + CA | 20 + 25 | 80 | 76 | |
| 2 + CA | 10 + 25 | 77 | 72 | |
| 1 + CA | 20 + 25 (repeat) | 92 | 82 | |
| 1 + CA | 20 + 25 (repeat) | 92 | 84 | |
| 1 + CA | 10 + 25 | 92 | 84 | |
| CA | 25 | 68 | — | |
| 1 | 20 | 66 | 56 | |
| 1 + CA | 5 + 25 | 88 | 66 | |
| 3 + CA | 2.5 + 25 | 82 | 62 | |
| 2 + CA | 2.5 + 25 | 79 | 60 | |
| 1 + CA | 5 + 25 | 86 | 66/82* | *phototester needed recharging |
| 3 + CA | 5 + 25 | 84 | 75 | |
| 2 | 5 | 56 | 56 | |
| 1 | 5 | 56 | 56 | |
| 3 | 5 | 68 | 66 | |
| Blank | — | 44 | 42 | |

CA = citric acid (as free acid)

As one can see in the above Tables, the polymeric coagulant/coalescing agents can effectively treat water, but generally do not provide for long-term stability of the water. The zero times above actually were run at approximately five minutes after treatment had occurred, and the two hour times were run two hours after treatment had occurred. During this period of time, if additional iron salts or other transition metal salts were undergoing oxidation to form precipitating species such as iron oxides or iron hydroxides, thought to be in the ferric state, the percent transmission measured by the phototester decreased and the results expected from discharged water from the oil rig would be poorer. These polymers in the presence of citric acid as the iron chelating agent had an affect on the water quality which included increased hydrocarbon recovery in the Wemco and long-term stability in terms of solid formation. The water discharged clearly met requirements.

From time to time phototester results were erratic when the phototester batteries began to discharge to the point where they required recharging. Also, as water samples were taken for testing, different initial water qualities were observed. As best we can, we have indicated when these results existed in the above Tables. Our invention therefore has been clearly described in the above discussions, Tables, and test results, and show that improved water quality results and improved hydrocarbon recovery can be obtained by treating the produced waters entering a Wemco unit with a combined product including a polymeric coagulant coalescing agent (sometimes called a flocculant) with an iron chelating agent as above described and demonstrated.

Having described our invention, we claim:

1. In a process for recovering residual hydrocarbon values from oil production waters containing dissolved iron salts prior to discharge from an off-shore oil rig comprising:
  (a) collecting crude oil emulsions from undersea formations;
  (b) separating oily hydrocarbon fractions from oily water fractions in an operation which breaks crude oil emulsions into oily hydrocarbon and oily produced water fractions;
  (c) collecting oily hydrocarbon values for further processing;
  (d) treating oily produced water fractions by air-blowing agitation to form and collect a floating hydrocarbon-enriched foamy layer for recycle to recover residual hydrocarbon values and thereby also forming an essentially oil-free oil production waste overboard water for discharge; the improvement comprising treating the oily produced water fraction containing dissolved iron salts prior to air-blowing with an effective hydrocarbon coalescing and coagulating amount of a combination product comprising:
    (1) an iron chelating agent, and
    (2) polymeric coagulant coalescing agents.

2. The improved process of claim 1 wherein the iron chelating agent is chosen from the group consisting of citric acid, ethylene diamine tetraacetic acid, hydroxyethylenediamine triacetic acid, hydroxyacetic acid, and mixtures thereof.

3. The process of claim 1 or claim 2 wherein the polymeric coagulant flocculant is chosen from the group consisting of water soluble vinylic polymers containing at least one of the monomers chosen from the group consisting of acrylamide; methacrylamide; acrylic acid; methacrylic acid; ethylacrylate; N,N-dimethylaminoethyl acrylate or acid salts thereof; N,N-dimethylaminoethyl methacrylate or acid salts thereof; N,N-dimethylaminoethyl acrylate, methyl sulfate or chloride quaternary salt; N,N-dimethylaminoethyl methacrylate, methyl sulfate or chloride quaternary salt; diallyl dimethyl ammonium chloride; acrylamido methyl propane sulfonic acid, sulfonated N-alkyl substituted acrylamide; and methacrylamido trimethyl ammonium chloride.

4. The process of claim 1 wherein the oil production waters contain at least 5 ppm water soluble iron salts and the iron chelating agent is chosen from citric acid, ethylene diamine tetraacetic acid, hydroxyethyldiamine triacetic acid, and mixtures thereof.

5. A process for improving water quality of overboard water discharged from off-shore crude oil recovery operations which comprises adding to produced waste waters containing soluble iron salts exiting an oil-water separator which separates hydrocarbon values from water recovered from crude oil, an effective hydrocarbon coalescing and coagulating amount of a combination of:
  (a) an iron chelating agent, and
  (b) polymeric coagulating/coalescing agents, and then separating the coalesced hydrocarbon from the water before overboard water discharge.

6. The process of claim 5 wherein the iron chelating agent is chosen from the group consisting of citric acid, ethylene diamine tetraacetic acid, hydroxyethylenediamine triacetic acid, and mixtures thereof; and the polymeric coagulating/coalescing agent is chosen from the group consisting of water-soluble vinylic polymers, or mixtures thereof; containing at least one of the following monomers:
  (a) acrylamide, methacrylamide, acrylic acid, methacrylic acid, methyl or ethyl acrylate, dimethylaminoethyl methacrylate, or its acid salts or lower alkyl ($C_1$–$C_3$) quaternary salts, dimethylaminoethyl acrylate or its acid salts or quaternary salts, diallyldimethyl ammonium chloride, methacrylamido trimethyl ammonium chloride, acrylamido methyl propane sulfonic acid, and N-substituted sulfonated alkyl acrylamide: wherein
  (b) the weight average molecular weight of the polymers ranges from 100,000 to 25,000,000.

7. The process of claim 6 wherein the iron chelating agent is citric acid and the polymeric coagulating/coalescing agent is chosen from homopolymers and copolymer of at least one of the monomers:
  (a) acrylamide, acrylic acid, methacrylic acid, N,N-dimethylaminoethyl methacrylate, and its acid salts, methyl or ethyl acrylate; and
  (b) the weight average molecular weight ranges from about 200,000 to about 20,000,000.

8. The process of claim 7 wherein the polymeric coagulating/coalescing agent is chosen from the group consisting of homopolymer of N,N-dimethylaminoethyl methacrylate and its acid salts, copolymers of N,N-dimethylaminoethyl methacrylate and its acid salts with acrylamide; which homopolymers and copolymers have a weight average molecular weight ranging between about 200,000 and about 5,000,000.

9. The process of claim 7 wherein the polymeric coagulating/coalescing agent is chosen from copolymers containing at least one of the monomers:
  acrylic acid, or its salts
  acrylamide
  methacrylic acid, or its salts, and
  ethyl acrylate; and wherein the weight average molecular weight ranges from about 2,000,000 to about 20,000,000.

10. The process of claim 9 wherein the copolymers are chosen from the group consisting of acrylic acid/acrylamide copolymers containing from ten (10) mole percent to ninety (90) mole percent acrylic acid and from ninety (90) mole percent to ten (10) mole percent acrylamide and having a molecular weight of from 5,000,000 to 20,000,000; and copolymers of methacrylic acid and ethyl acrylate containing at least thirty (30) mole percent methacrylic acid; and having a molecular weight ranging from about 1,000,000 to about 5,000,000.

* * * * *